May 8, 1934.  A. G. LANGENKAMP ET AL  1,957,656
BREAD RACK
Original Filed March 4, 1932  3 Sheets-Sheet 3
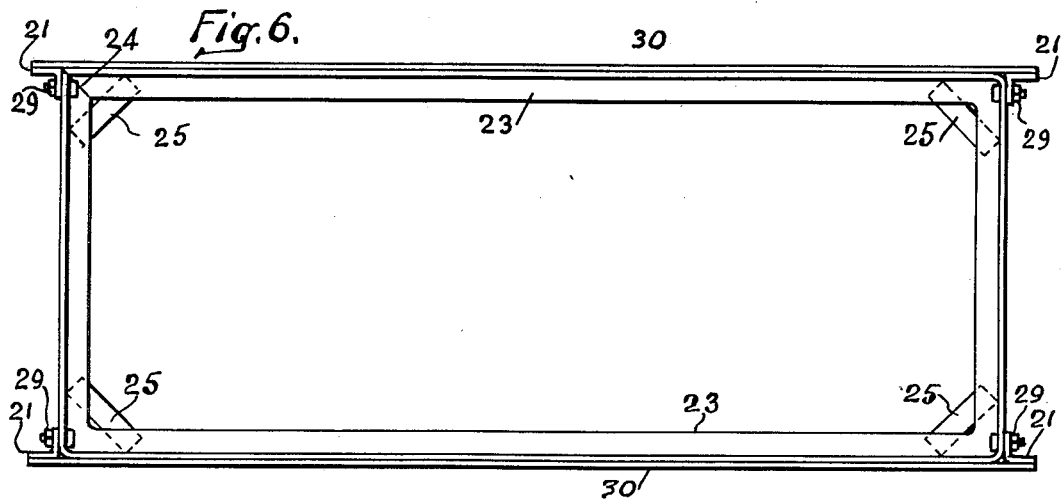
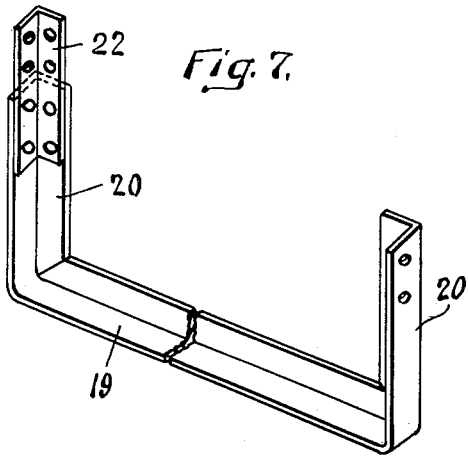
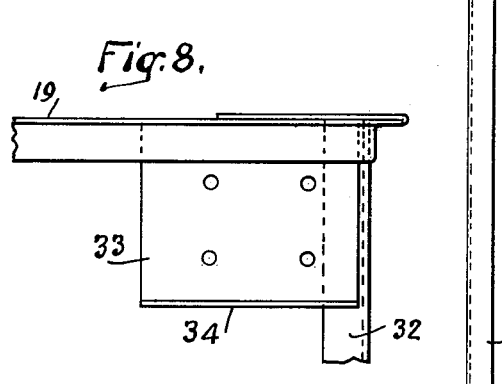
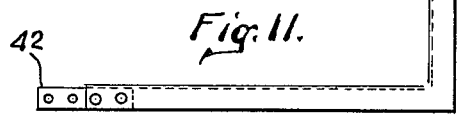
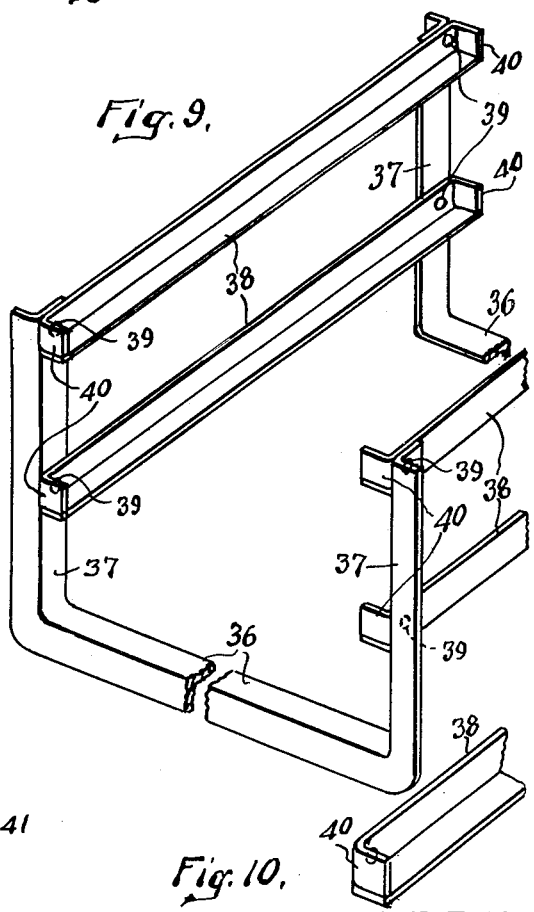
INVENTORS
ALBERT G. LANGENKAMP,
ROY H. McELROY,
BY
Toulmin & Toulmin
ATTORNEYS Patented May 8, 1934

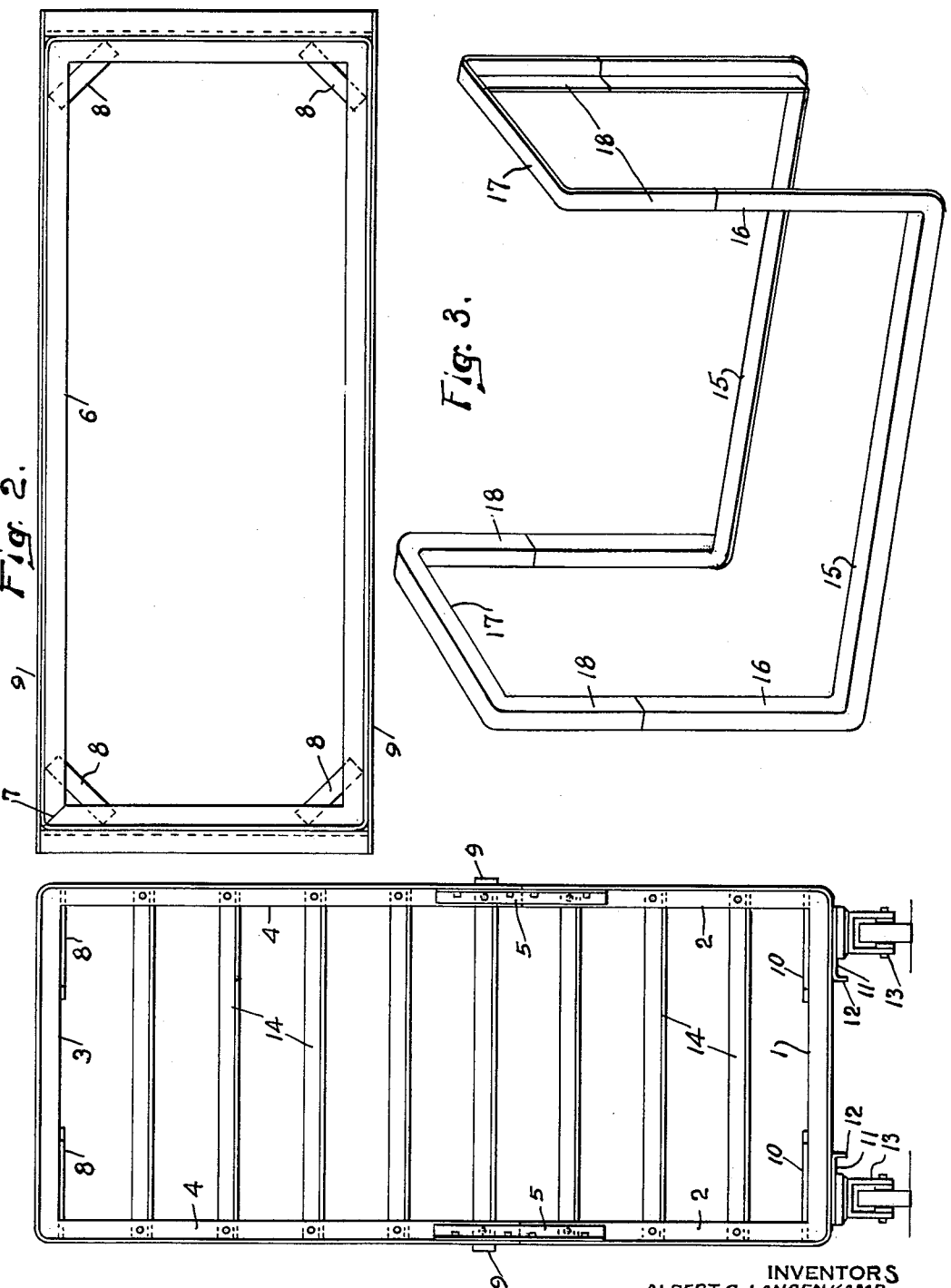

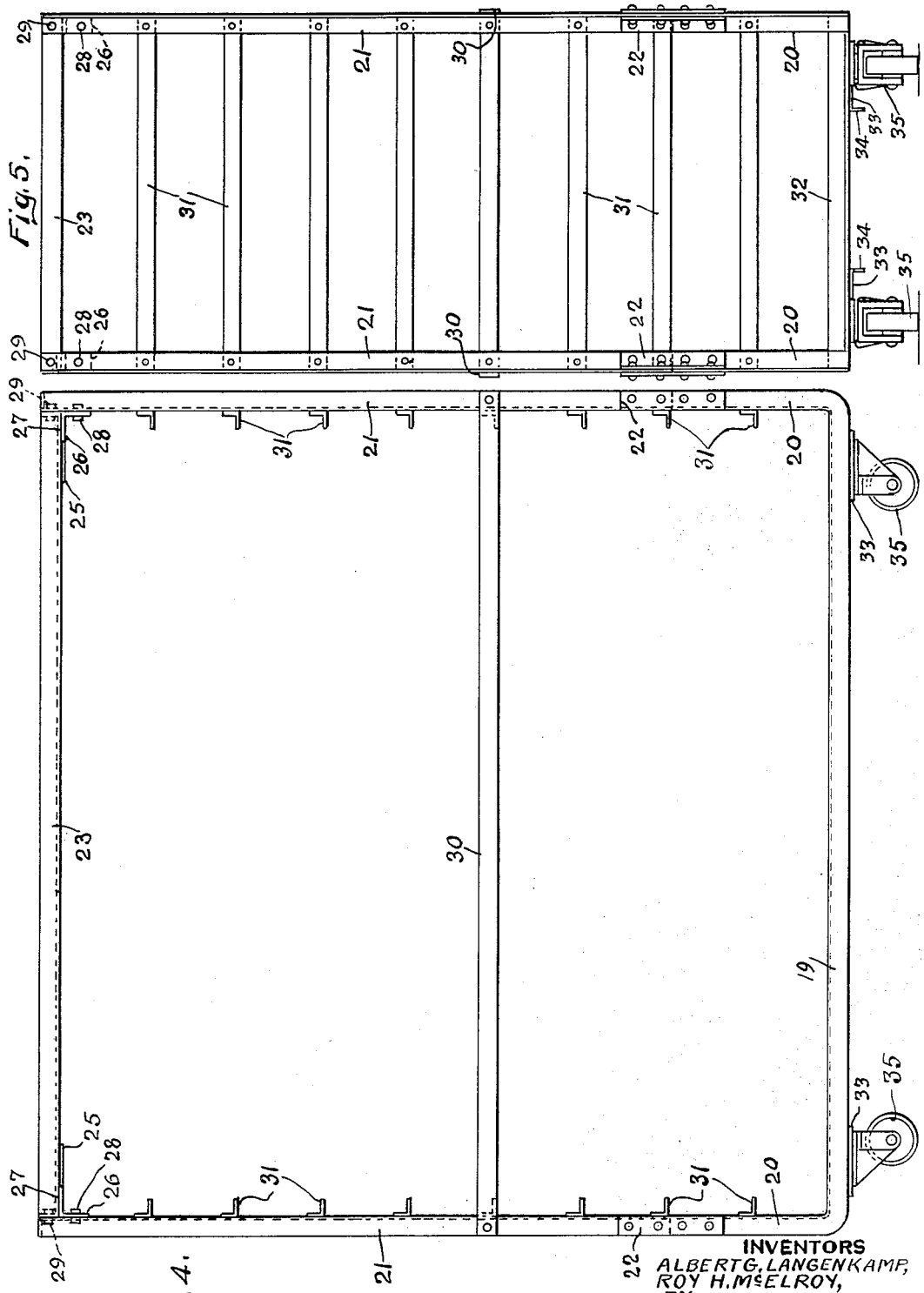

UNITED STATES PATENT OFFICE 1,957,656

BREAD RACK

Albert G. Langenkamp and Roy H. McElroy, Dayton, Ohio, assignors to International Engineering, Inc., Dayton, Ohio, a corporation of Ohio Original application March 4, 1932, Serial No. 596,824. Divided and this application October 15, 1932, Serial No. 637,970

6 Claims. (Cl. 211—182)

It is the object of this invention to provide a rack for trays, which will not become loosened, warped or twist under the load of bread which the trays carry, and will withstand the necessary abuse and heat to which such articles are subjected.

This invention relates to improvements in bread racks, and has for its object to provide a bread rack composed of suitably attached angle irons for forming the framework of the rack, and ledges for supporting trays of bread on the rack.

It is our object to provide a tray support which will interlock with the trays and hold them in position, which support also constitutes connecting members at the ends of the rack, holding the side frames together.

It is particularly the object of our invention to provide a bread rack having at each side or end a U-shaped member formed from one single piece of metal, such as an angle iron. This U-shaped member may form the whole side or end frame of the rack, or it may form the lower portion of the end frame, with legs attached thereto in any suitable manner to form with the U-shaped member the complete side or end frame. The whole frame of the rack may be composed of a plurality of U-shaped members, suitably united.

It is our object to provide a system of either longitudinal or transverse U-shaped frame members, interconnected by angular tray supports, and in some forms having a continuous rectangular frame mounted on said U-shaped members for interconnecting them and cooperating with the supports in forming a unitary truck.

It is a further object to provide a construction which may be extended from the U-shaped side or end frame members vertically by attaching additional end frame members carrying tray supporting members.

It is also an object of this invention to provide, in connection with the side or end frames, horizontally extending support members, preferably made of angle irons, with one leg of each angle iron suitably bent and attached to the frames.

It is also an object to provide, in connection with a bread rack, a supporting plate located at each lower corner of the frame for giving strength and rigidity to the frame, and for providing means to which casters may be attached for transporting the rack on a floor or other suitable surface.

This is a division of copending application Ser. No. 596,824, filed March 4, 1932, and patented Jan. 9, 1934, as Patent No. 1,943,023.

Other advantages of this invention will appear from the following description taken in connection with the drawings.

Referring to the drawings:

Figure 1 shows an end elevation of a bread rack in which the end frame is composed of two U-shaped members suitably united to form a rectangular frame.

Figure 2 is a top plan view of the rack shown in Figure 1.

Figure 3 shows a modified form of bread rack frame composed of four U-shaped members.

Figure 4 shows in side elevation a bread rack in which there is a second modified form of frame.

Figure 5 is an end elevation of the rack shown in Figure 4.

Figure 6 is a top plan view of the rack shown in Figures 4 and 5.

Figure 7 is a perspective view showing a U-shaped side member used to form part of the rack shown in Figures 4, 5 and 6. In this figure the side member is partly broken away.

Figure 8 is a bottom plan view of one corner of the rack, showing the reenforcing and caster supporting plate.

Figure 9 is a perspective view of one side of a modified form of rack in which the angle irons forming tray supports have the vertical parts thereof bent over the ends of the horizontal parts to form stops to be engaged by the trays supported thereon.

Figure 10 is a perspective of one end of the tray support shown in Figure 9.

Figure 11 is an angularly shaped bar which has two sides, one perpendicular to the other.

The various racks are composed of a plurality of U-shaped members properly united to form the frame parts of the racks. In the form shown in Figure 1 the rack has at each end a rectangular frame composed of a lower U-shaped member, which has a bottom 1, legs 2 and an upper U-shaped member which has a top 3 and legs 4 resting on top of the legs 2 and attached thereto by means of gussets 5.

The parts of this frame are composed of angle irons, the transverse faces of which afford means to which supporting bars are attached, while the longitudinal faces extend outwardly from the frame and longitudinally with respect to the frame. The two end frames are connected at their tops by means of a top frame 6, which is formed of one single piece of angle iron bent in the form of a rectangle and united at one corner, as indicated by the numeral 7. The corners of this top frame are braced by brace members 8, attached to the frame in any suitable manner, preferably by welding.

The two end frames are united intermediate the tops and bottoms thereof by means of longitudinal brace bars 9, one on each side. These end frames are also connected at their bottoms by means of bars, not shown. The bottom longitudinal bars are connected to the parts 1 of the end frames by means of diagonal brace bars 10, similar to the brace bars 8 and similarly located with respect to the bottom of the frame.

Beneath each corner of the rack and suitably attached thereto is a corner plate 11, which has on one edge a turned-down reenforcing edge 12, which gives strength and rigidity to the plate. To each plate is attached, in any suitable manner, a caster 13. To each end frame is attached a plurality of tray supports 14, consisting of angle irons having their vertical sides attached to the frames, while their other sides extend inwardly for supporting the trays.

In the form shown in Figure 3 the frame is composed of four U-shaped members, two side members, each having a bottom 15, and legs 16 extending upwardly from the bottom, and two U-shaped end members, each having a top 17 and downwardly extending legs 18, each leg resting upon one of the legs 16. These U-shaped members are joined together in any suitable manner, preferably by means of gussets such as the gussets 5, shown in Figure 1.

In the form shown in Figure 4 the frame is composed of two U-shaped side members having a bottom 19 and an upwardly extending leg 20 at each end. Supported on top of each leg is a post 21 attached thereto by means of a gusset 22. These two frames are suitably connected to form the rack.

Attached to the tops of the posts is a top frame 23, rectangular in shape, and formed from a single piece of angle iron having its ends attached at one corner in a joint 24. This frame is supported on the tops of the posts by means of brackets 26, one bracket being attached to each post adjacent its end and just beneath the top frame. The corners of the top frame are strengthened by diagonally disposed braces 25. The brackets 26 are attached to the posts by means of rivets 28 and to the frame 23 by means of welds 27.

This top frame is attached to the posts by means of rivets 29. The form of top frame and its manner of connection to the posts render the upper end of the frame rigid and well adapted to stand rough usage. The posts on each side of the rack are connected by longitudinal bars 30, while the posts on each end of the rack are connected by transversely extending angle irons 31, which form supports for supporting bread trays on the rack, and a bottom bar 32.

Beneath each corner of the rack and suitably attached thereto is a corner plate 33, which has extending downwardly from one edge thereof a strengthening element 34, formed integral with the plate. These corner plates not only serve to give rigidity and strength to the rack, but also serve as means to which casters 35 are attached for supporting the rack so it may be rolled from place to place.

In the form shown in Figure 9, each side of the rack has a U-shaped frame having a bottom 36 and upwardly extending end legs 37. These U-shaped end members are formed of angle irons so bent that one part of the angle iron extends in a vertical position transversely of the rack, while the other part extends longitudinally of the rack and forms inner faces, to which transverse tray supporting bars 38 are attached. Each of these bars is attached at one end to one of the end members by means of rivets or bolts 39.

The vertical part of each U-shaped transverse bar is longer than the horizontal part, and is bent inward and rests upon the horizontal bar to form end stops 40 for properly holding the bread trays positioned on the transverse bars, which serve as supports for the trays. The trays are elevated and positioned on the bars, between the end stops 40 on each bar.

Figure 10 shows in perspective one end of one of the bars 38. The stop member 40 is clearly shown in this figure.

Figure 11 shows an angular member 41, which is composed of two parts, one at right angles to the other. The member shown in Figure 11 may be united to another similar member for forming one end or side of the rack, or four of these members may be united to form a large side or end frame of a rack. When more than two of these members are used they are joined together by means of gussets 42. All of these gussets are of such a shape as to correspond to the shape of the members they unite.

We desire to comprehend within our invention such modifications as may be embraced within our claims and the scope of our invention.

Having thus fully described our invention, what we claim as new and desire to secure by Letters Patent, is:

1. In a bread rack, inner frame members comprised of lower one-piece U-shaped frame members and upper inverted one-piece U-shaped frame members having their ends joined together, and lower longitudinal side rails joining the end groups of U-shaped frame members.

2. In a bread rack, inner frame members comprised of lower one-piece U-shaped frame members and upper inverted one-piece U-shaped frame members having their ends joined together, lower longitudinal side rails joining the end groups of U-shaped frame members, reenforcing plates between said U-shaped members and longitudinal members to reenforce them and align them, and supporting flanges on said U-shaped frame members to support bread trays therebetween.

3. In a bread rack, a pair of one-piece U-shaped side members, each having at each end an upwardly extending leg, a post attached to each leg, means to connect the side members, and a one-piece rectangular frame attached to the upper ends of the posts.

4. In a bread rack, a pair of one-piece U-shaped side members, each having at each end an upwardly extending leg, a post attached to each leg, a bracket adjacent the upper end of each post, and a one-piece rectangular frame resting on the brackets and attached thereto.

5. In a bread rack, a pair of one-piece U-shaped side members, each having at each end an upwardly extending leg, a post attached to each leg, a bracket adjacent the upper end of each post, and a one-piece rectangular frame welded to the brackets and directly attached to the posts.

6. In a bread rack, a pair of one-piece U-shaped side members, each having at each end an upwardly extending leg, a post resting on the end of each leg and attached thereto, a bracket adjacent the upper end of each post, a one-piece frame welded to the brackets and directly attached to the posts, and a brace on the frame adjacent each post.

ALBERT G. LANGENKAMP.
ROY H. McELROY.